INVENTOR.
NORMAN E. CHASEK
BY
Curtis, Morris & Safford
ATTORNEYS

INVENTOR.
NORMAN E. CHASEK
BY
Curtis, Morris & Safford
ATTORNEYS

INVENTOR.
NORMAN E. CHASEK
BY
Curtis, Morris & Safford
ATTORNEYS

United States Patent Office 3,311,828
Patented Mar. 28, 1967

3,311,828

COMMUNICATION SYSTEM, METHODS, AND APPARATUS UTILIZING VESTIGIAL-SIDEBAND, SUPPRESSED-CARRIER P.C.M. SIGNALS

Norman E. Chasek, Stamford, Conn., assignor to International Microwave Corporation, Cos Cob, Conn.
Filed Feb. 12, 1963, Ser. No. 257,978
6 Claims. (Cl. 325—49)

This invention relates to communication systems employing pulse code modulation and in particular to a communication system, methods and apparatus for the coherent detection of vestigial-sideband, suppressed-carrier P.C.M. signals and capable of operation despite the presence of Doppler and other causes of frequency shifts in the received signal.

In communication systems utilizing what is known as pulse code transmission, the signal to be transmitted usually consists of a modulated carrier which can be detected at the receiver by normal envelop detection systems. However, it is desirable in communication systems not to transmit the carrier, i.e. to suppress the carrier, and thereby to save 6 db in peak power transmission capability at the transmitter It is further more desirable to transmit a vestigial-sideband signal instead of the normal amplitude-modulation, double-sideband signal. This vestigial-sideband transmission saves about 40 percent in the bandwidth required for transmission and saves an additional 2 db in peak transmitter power.

The transmission of such a suppressed-carrier pulse code modulation (P.C.M.) signal requires that the receiver re-create the carrier that would normally be transmitted in amplitude-modulation systems. This carrier, which is re-created by the receiver, must be at precisely the same frequency and at the same phase as the suppressed carrier would have been, if it had been transmitted and received. The tolerance on frequency error for this re-created carrier is zero; absolute accuracy is required. In fact, the phase of this re-created carrier must be correct to within a small number of degrees. This process of detection using a re-created carrier is referred to commonly as coherent detection or synchronous detection. Coherent detection has an additional 1 to 2 db power advantage over envelop detection because the carrier which has been supplied by the receiver has no noise associated with it, whereas in the case of a transmitted carrier, there is always noise mixed in with the carrier in the detection process.

Prior to the present invention systems which have been available for coherent detection of suppressed-carrier, vestigial (or single) sideband signals have utilized either of two methods. In one method, a reduced amplitude carrier is transmitted, which is then extracted at the receiver, amplified and used for coherent detection. In the other method, an exceedingly stable oscillator is used at the receiver which is tuned to the normal transmitted carrier frequency. The first method is applicable in systems for transmitting voice signals and the like in which the spectrum goes to zero in the vicinity of the carrier frequency Thus, the reduced carrier can be identified and extracted, because the reduced carrier is effectively spaced from the other components of the signal spectrum. However, P.C.M. signals have a continuous spectrum extending through the carrier frequency, and this method of transmitting a reduced carrier cannot be employed. The second method which employs an exceedingly stable oscillator cannot be used where Doppler frequency shifts or other frequency shifts are to be encountered in the signal being received.

Several methods for the detection of double-sideband, suppressed-carrier P.C.M. signals have been patented; however, they are not applicable to vestigial sideband (or single sideband) transmission. One prior method operates on the premise that when the carrier supplied by the receiver is at precisely the right frequency and phase, there will be no quadrature components in the received signal. This, however, is not applicable to vestigial-sideband transmission because there are always quadrature components present. A second method uses differential P.C.M. in which a mark is transmitted by not reversing the phase of the carrier. Hence by delaying the received signal by one pulse width and using the delayed signal as the demodulating local carrier, a coherent detection system results is 1 to 2 db less efficient than when a noise-free carrier is used for detection. It is, therefore, the general object of this invention to provide novel communication methods and apparatus enabling the utilization of vestigial-sideband, suppressed-carrier pulse code modulation signals that are even capable of operating satisfactorily in the presence of Doppler frequency shifts or other frequency shifts.

Advantageously, the methods and apparatus of the present invention re-create a carrier at the receiver at the same frequency and at the same phase as the non-existent carrier would have been if it had been transmitted and received by the same system, and operable despite Doppler frequency shifts or despite frequency shifts introduced by the transmission media or by the transmitter itself.

In accordance with the invention, a small auxiliary signal is transmitted along with the main signal. This auxiliary signal is derived at the transmitter by shifting the frequency of the carrier before it is eliminated by some fraction (less than one) of the P.C.M. pulse-repetition frequency. This auxiliary signal is shifted into a region of the signal spectrum where the vestigial sidebands have been reduced to zero.

At the receiver after intermediate frequency amplification, this auxiliary signal is extracted from the transmitted signal. It is beat with the signal from a local oscillator. This local oscillator provides a signal approximately equal to the same fraction of the P.C.M. pulse-repetition frequency by which the carrier frequency was shifted at the transmitter. This process of beating the extracted auxiliary signal with the signal from the local oscillator provides a re-created signal at approximately the true carrier frequency. Then this signal is beat with the received P.C.M. signal so as to convert it to the ultimate utilization frequency, e.g. baseband or video pulses. However, the pulse-repetition rate of these pulses is shifted by the error in the locally supplied carrier. This pulse-repetition rate is then reduced by the same fraction as used at the transmitter (say ½) and used to lock the above-mentioned local oscillator. It will be shown that if the fraction used is less than unity, then the phase and frequency error of the locally re-created carrier is caused to go to zero and perfect coherent detection results. Furthermore, if the received signal frequency shifts by small amounts due to Doppler effects or transmitter instability, the locally re-created carrier is automatically shifted by the proper amount to retain proper conditions for coherent detection.

A communication system and apparatus embodying the present invention re-creates the carrier at the receiving station at precisely the same frequency and at very nearly the same phase as the original carrier which was suppressed at the transmitting station and hence was not present in signal being received. Moreover, this re-created carrier is automatically accommodated to Doppler frequency shifts due to reflection or retransmission of the signal from fast-moving objects or due to frequency shifts in the transmitter or receiver local oscillator. Such a receiver permits considerable savings in power and spectrum requirements.

These and other objects and advantages, the nature of the present invention and its various features will appear more fully upon consideration of the illustrative embodiment now to be described in detail in connection with the accompanying drawings, in which.

Figure 1:
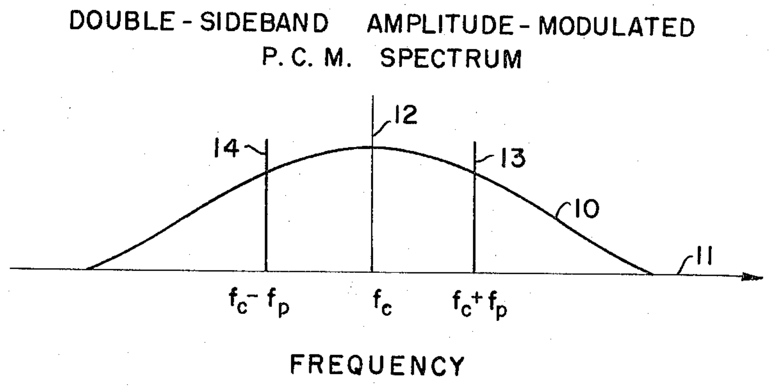
FIGURE 1 illustrates the spectrum of the transmitted signal of a double-sideband amplitude-modulated P.C.M. signal.

Referring more specifically to FIGURE 1, there is shown the frequency-amplitude spectrum 10 of a double-sideband, amplitude modulated P.C.M. signal. Along the horizontal line 11 are plotted values of frequency, with the direction of increasing frequency being toward the right. The ordinate values represent the relative amplitude of the various frequency components. At the center of the spectrum is line 12 representing the carrier frequency component $f_c$ of the spectrum. Spaced equally above and below the carrier frequency $f_c$ are two vertical lines 13 and 14 which are the carrier frequency plus and minus the pulse repetition rate $f_p$.

Figure 2:
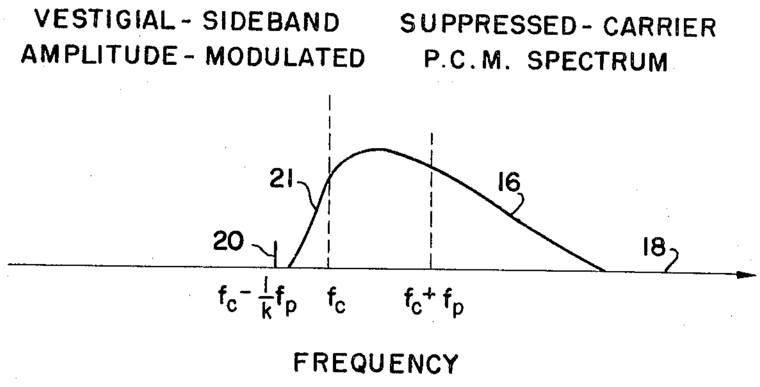
FIGURE 2 illustrates the spectrum of the transmitted signal of a vestigial-sideband amplitude-modulated P.C.M. signal with the small auxiliary signal.

FIGURE 2 shows the vestigial sideband, amplitude-modulated, suppressed-carrier P.C.M. spectrum 16, with values of frequency being plotted along the line 18, increasing frequency being toward the right. It is noted that only a vestige 21 of the sideband components remain in the spectrum below the frequency of the carrier $f_c$. In order to provide for the re-creation of the carrier signal at the receiver, an auxiliary signal 20 is transmitted along with the vestigial-sideband, suppressed-carrier signal 16. This auxiliary signal is located in a region of the signal spectrum where the vestigial sidebands 21 are reduced to zero. This auxiliary signal term 20 is inserted at the transmitter by taking a sample of the carrier frequency $f_c$ before it is suppressed and beating it with a precisely determined fraction, $1/k$, of the pulse repetition frequency $f_p$. In this example the fraction $1/k$ is an integral power of one-half.

Figure 3:
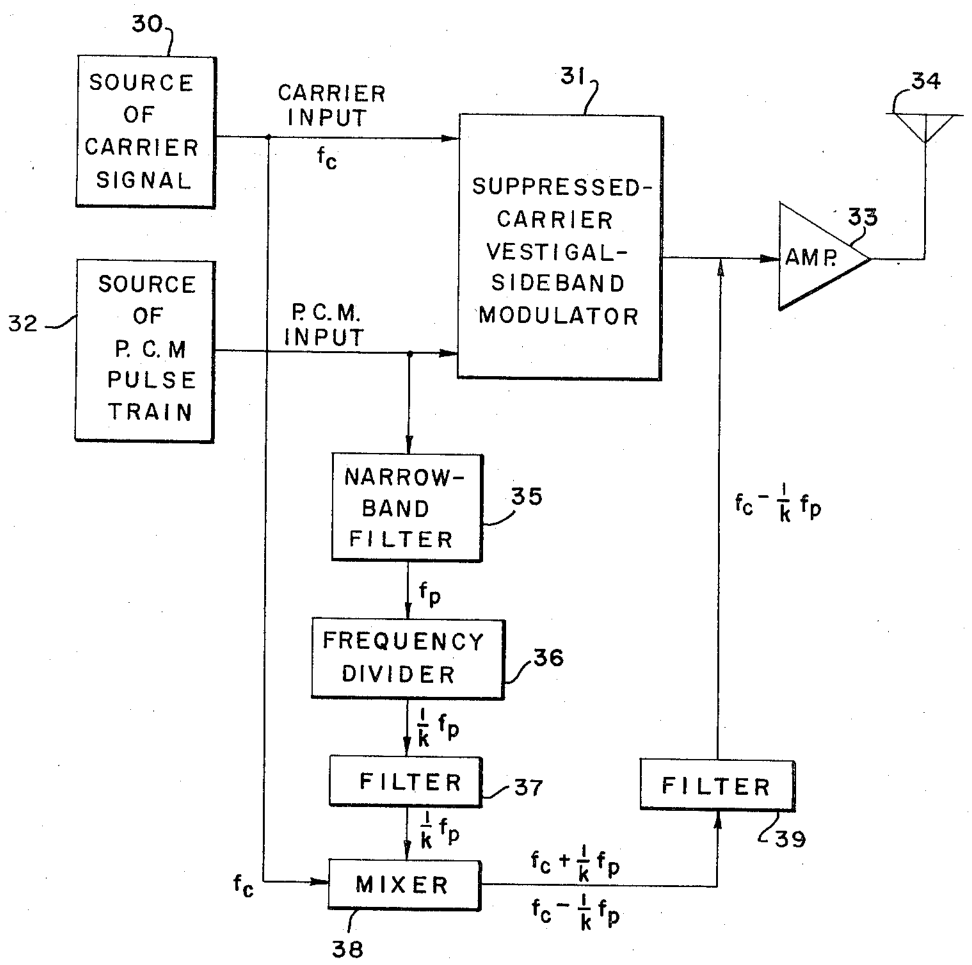
FIGURE 3 is a schematic circuit diagram of the transmitter system for generating the auxiliary signal.
Figure 4:
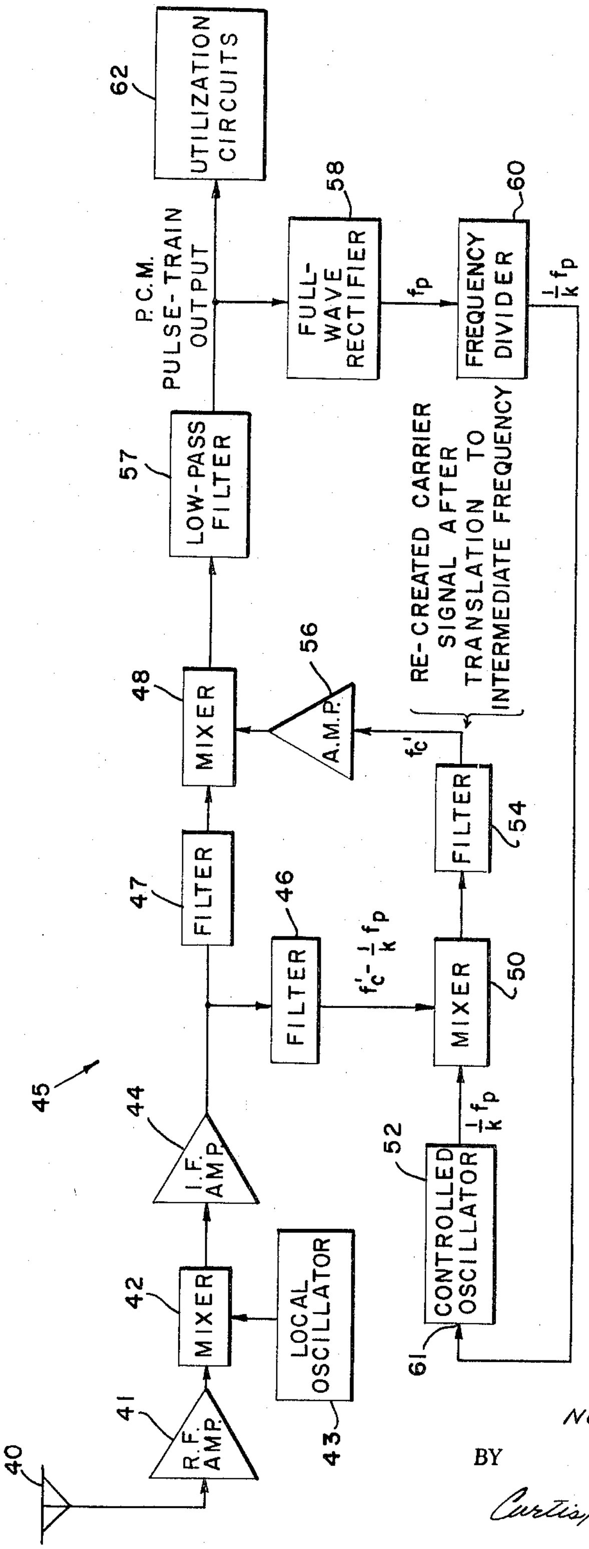
FIGURE 4 is a schematic circuit diagram of the coherent detection receiver which re-creates the suppressed carrier.

A novel transmitting system for generating this auxiliary signal 20 is shown in FIGURE 3. This system includes an oscillator 30 for providing the carrier frequency signal, and this oscillator feeds into a suppressed-carrier, vestigial-sideband modulator 31. Also, feeding into the modulator 31 is a source 32 of the train of pulses, i.e. the pulse code modulated pulse train, conveying the information to be transmitted. In this modulator 31 the carrier signal is amplitude modulated in accordance with the P.C.M. signal from the source 32, and one of the sidebands is suppressed except for a vestige thereof, as illustrated in FIGURE 2. Also, the carrier signal is suppressed therein. The output from the modulator 31 is fed into a transmitter amplifier 33 which feeds a transmitting antenna 34.

In order to obtain the pulse repetition frequency $f_p$, the P.C.M. pulse train from the source 32 is fed through a narrow band filter 35 tuned to the prior known pulse-repetition frequency $f_p$. A fraction $1/k$ of this pulse-repetition frequency is obtained by passing the frequency obtained from the narrow band filter through at least one conventional type of flip-flop (bi-stable) circuit 36 which serves as a frequency divider to reduce this frequency by $(\frac{1}{2})^n$ where $n$ is the number of flip-flops (or bi-stable circuits). The output $$\frac{1}{k}f_p$$

from the frequency divider 36 is again filtered by passing it through another narrow band filter 37, and the resulting sine wave is mixed with the carrier frequency in a mixer 38, and the desired frequency $$f_c-\frac{1}{k}f_p$$

is filtered out of the output of the mixer 38 by means of a filter 39. This shifted carrier term $$f_c-\frac{1}{k}f_p$$

is then inserted into the transmitted signal, and it is arranged to be in a region where the vestigial sidebands 21 have been reduced to zero. The generation of the vestigial-sideband, suppressed-carrier signal is accomplished in the modulator 31 using well-known methods.

At the receiver a conventional superheterodyne front end is used. The incoming signal from the transmitter is picked up by an antenna 40 and is suitably amplified by means of radio-frequency amplifier circuits 41. The output from the R.-F. amplifier circuits 41 is fed into a mixer stage 42 together with the output from a local oscillator 43, producing a suitable intermediate frequency signal which is fed into an intermediate-frequency amplifier 44. A novel coherent detection receiver circuit, generally indicated at 45, is placed at the output of the intermediate-frequency amplifier 44. This novel coherent detection receiver 45 includes a filter 46 which extracts the auxiliary signal 20, which has been translated to intermediate frequency. To indicate that this auxiliary signal has been translated to intermediate frequency, a prime symbol is added to the carrier frequency symbol, and so the translated auxiliary signal is expressed $$f_c'-\frac{1}{k}f_p$$

The vestigial-sideband, suppressed-carrier P.C.M. signal 16 (translated to the intermediate frequency) is fed through a filter 47 directly into a mixer 48, and the filter 47 excludes the auxiliary signal 20.

The frequency of the auxiliary signal 20 translated to the intermediate frequency is known at the receiver to have an indeterminacy at least equal to plus or minus the sum of the drift in frequency of the transmitter and receiver local oscillators and the Doppler frequency shift, together with any other frequency shifts which may occur in the transmitting medium. The bandwidth of the filter 46 used to extract this auxiliary signal 20 must be sufficiently wide to accommodate this indefiniteness, but the bandwidth of this filter 46 should be sufficiently narrow in any event to exclude from its pass band the vestigial sideband 21 (translated to intermediate frequency). The extracted auxiliary signal 20 is passed to a mixer 50 where it is mixed with the output signal from a controlled local oscillator 52. This oscillator 52 is initially tuned as close as is practicable to the fractional amount of the P.C.M. pulse-repetition frequency $$\left(\frac{1}{k}f_p\right)$$

by which the carrier has been shifted at the transmitter in producing the auxiliary signal 20.

Consequently, at the output of the mixer 50 is provided a term nearly equal to the true carrier frequency after translation to the intermediate frequency $f_c'$. This term $f_c'$ is filtered out by filter 54 and is amplified in an amplifier 56 and passed to the mixer 48 where it is beat with the incoming vestigial-sideband, suppressed-carrier P.C.M. signal, and thus, the I.F. signal is converted to base-band, i.e. to its ultimate utilization frequency. To filter out the undesired higher sum frequency components so as to leave only the P.C.M. signal, the output of mixer 48 is passed through a low-pass filter 57.

If the oscillator 52 were initially tuned to precisely the correct frequency and phase, the output from the filter 56 would be the undistorted P.C.M. signal. However, it is very unlikely that the oscillator 52 would ever be so precisely tuned initially. In order to control the oscillator 52, a part of the output of the filter 57 is fed into a full-wave rectifier 58. This is necessary to generate a coherent signal at the pulse repetition frequency $f_p$. (The process by which the carrier frequency is suppressed also suppresses the coherent pulse-frequency term.) The output of the full-wave rectifier 58 is fed into frequency divider 60 which corresponds in action with the frequency-divider circuit 36 used in the transmitter (FIGURE 3). Thus, for example, this frequency divider 60 includes one or more conventional type of flip-flop (bi-stable) circuits, being the same in number as were used in the frequency divider 36 at the transmitter. The output of the divider 60 is then fed to a control point 61 to control the oscillator 52 so as to lock this oscillator at the proper frequency for re-creating the true carrier translated to intermediate frequency. Thus, coherent detection results, and the true P.C.M. pulse train is fed into the output utilization circuits 62.

If it is assumed that initially the frequency of the oscillator 52 is in error by $\Delta f$, i.e. that it is initially $$\frac{1}{k} f_p+\Delta f$$

then the output of mixer 50 is also initially in error by $\_\_f$ which in turn causes the pulse-repetition frequency at the output of the full-wave rectifier 58 to be in error by $\Delta f$. The frequency divider 60 reduces this frequency error to $1/k$ of its initial value, where $1/k$ is the fraction less than one by which the divider 60 multiplies its input signal. The output frequency of the oscillator 52 is controlled so that it is equal to the input locking signal frequency supplied to the point 61. Thus, the output frequency of oscillator 52, after tracing the control action once around the loop back to the control point 61, is $$\frac{1}{k} f_p+\frac{1}{k}\Delta f$$

instead of $$\frac{1}{k} f_p+\Delta f$$

its initial state. As the control action proceeds around the loop again, the frequency of oscillator 52 becomes $$\frac{1}{k} f_p+\left(\frac{1}{k}\right)^2\Delta f$$

After $q$ circuits around the control loop, the controlled frequency of the oscillator 52 becomes $$\frac{1}{k} f_p+\left(\frac{1}{k}\right)^q\Delta f$$

where $q$ rapidly approaches infinity. Since $1/k$ is a fraction less than one, for example ½, ¼ or ⅛, depending upon the number of flip-flop (bi-stable) circuits used in the frequency divider 60, the frequency error rapidly automatically shrinks to zero.

A similar line of reasoning can be used to show that the phase error of the signal from the oscillator 52 rapidly automatically shrinks toward zero. The frequency divider 60 also divides the phase as it does the frequency. Hence, by utilizing a controlled local oscillator 52 wherein the output phase is made nearly equal to the input phase, then the phase error $\Delta\theta$ becomes $$\left(\frac{1}{k}\right)^q\Delta\theta$$

wherein $q$ again rapidly approaches infinity.

When a Doppler frequency shift occurs, or a drift in transmitter or local oscillator frequency, this shift is cancelled around the first loop consisting of filter 46, mixer

50, filter 54, amplifier 56 and mixer 48. This is seen from the following reasoning: The input to mixer 50 is $$f_c'-\frac{1}{k}f_p\pm f_d$$

where $f_d$ is the Doppler frequency shift and $f_c'$ is the intermediate-frequency equivalent of the carrier frequency. The output of mixer 50 is $f_c'+f_d$. This term is subtracted from the vestigial-sideband signal in the mixing process occurring in the mixer 48. Since the P.C.M. signal into the mixer 48 has been shifted by the same $\pm f_d$, this subtraction cancels the effect of the Doppler shift or drifts in transmitter or receiver front end local oscillator drifts.

The absolute accuracy in generating a local carrier is possible because the two references needed are provided in the transmitted signal, namely, the shifted carrier and the pulse repetition rate.

If the bandwidth used for transmission is large compared to the Doppler frequency shifts and compared to drifts in the frequencies of the transmitter and receiver, local oscillators 30 and 43 then filters 46 and 54 can be made narrow compared to the main receiver bandwidth. Thus, advantageously, the noise present in the locally re-created signal translated to intermediate frequency can be proportionately less than the noise present in the received P.C.M. signal. Consequently, an improved signal-to-noise strength is provided.

Although this illustrative embodiment of the invention utilizes a vestigial-sideband, amplitude-modulated, suppressed-carrier P.C.M. signal, it will be understood that this invention is also applicable to single-sideband, amplitude-modulated, suppressed-carrier P.C.M. signals.

In the illustrative embodiment of the invention, the carrier frequency is re-created after the incoming signal has been translated to intermediate frequency. It is noted that the invention is applicable for re-creating the carrier frequency before the incoming signal is translated to intermediate frequency, as will be understood by those skilled in the art. However, in most installations it is more convenient to re-create the carrier frequency after translation to I.F. because the signal components involved are all at lower frequencies so that they can be processed by lower-frequency equipment, which is usually less complex and expensive.

It is noted that the terms "vestigial-sideband" and "single-sideband" are used as equivalents herein. As illustrated in FIGURE 2, a vestigial-sideband spectrum includes a small proportion or vestige 21 of the original spectrum on the opposite side of the carrier frequency from the sideband 16 which is being transmitted, but in a single-sideband spectrum there is no vestige remaining of the removed sideband.

It will be understood by those skilled in the art that in certain installations it will be advantageous to utilize a smaller value for $1/k$ than ½, for example, ¼ or ⅛, because this places the auxiliary signal 20 closer in frequency to the transmitted spectrum 16 and thus reduces the total bandwidth required. However, in installations where bandwidth is not a controlling factor, then a value of $1/k$ equal to ½ is used because this enables less complex frequency dividers to be used in transmitter and receiver, e.g., only a single flip-flop (bi-stable circuit) can be used for each of the frequency dividers.

When the vestigial sideband 21 is below the carrier frequency, then the auxiliary signal 20 is also below the carrier frequency, and when the vestigial sideband is above the carrier frequency, then the auxiliary signal 20 is also above the carrier. It is preferable to locate the auxiliary signal below the carrier frequency, because, for a given bandwidth, the mean frequency of the overall signal is then higher. Thus, the ratio of the extreme frequency to the mean frequency is lower, which facilitates the transmission and reception of the overall signal.

In all cases it is understood that the above described arrangements are intended to be illustrative of the possible specific embodiments which represent applications of the principles of the invention. Thus, numerous and varied other arrangements can readily be devised in accordance with these principles by those skilled in the art without departing from the spirit and scope of the invention.

What is claimed is:

1. Radio receiver apparatus for the coherent detection of single-sideband, suppressed-carrier, amplitude-modulated P.C.M. main signals, said main signals including an auxiliary signal having a frequency equal to the carrier frequency shifted by a fraction less-than-one of the pulse repetition frequency, said receiver apparatus having circuit means for receiving the main and the auxiliary signals, first mixer means coupled to said circuit means, filter means coupled to said circuit means for deriving the auxiliary signal, second mixer means coupled to the output of said filter means, controllable oscillator means having a control terminal and adapted to generate a frequency equal to said fraction less-than-one of the pulse repetition frequency, said second mixer means being coupled to the output of said controllable oscillator for re-creating the carrier signal, second circuit means for connecting the output of said second mixer means to said first mixer means for mixing said re-created carrier with the main signal for conversion of the main signal to a lower frequency, control circuit means in circuit with the output from said first mixer means and coupled to said control terminal for controlling the frequency of said controllable oscillator as a function of said fraction less-than-one of the pulse repetition frequency.

2. Radio receiver apparatus for the coherent detection of single-sideband, suppressed-carrier, amplitude-modulated P.C.M. signals being received and which include an auxiliary frequency term of a frequency differing from the suppressed-carrier frequency by a frequency difference equal to a fraction less than one of the pulse repetition frequency, said radio receiver apparatus including isolating means for isolating said auxiliary frequency term from the signals being received, controllable oscillator means for generating a signal equal to said difference, first mixer means coupled to said isolating means and to said controllable oscillator for beating said generated signal with said auxiliary frequency term for creating an effective carrier signal effectively corresponding to the suppressed carrier frequency, second mixer means coupled to the output of said first mixer means for beating said effective carrier signal with said P.C.M. signals being received for coherent detection thereof, and control circuit means for controlling the frequency of said controllable oscillator as a function of the output from said second mixer means.

3. Radio receiver apparatus for the coherent detection of single-sideband, suppressed-carrier, amplitude-modulated P.C.M. signals being received and which include an auxiliary frequency term of a frequency differing from the suppressed-carrier frequency by a frequency difference equal to a fraction less than one of the pulse-repetition frequency, said radio receiver apparatus including isolating means for isolating said auxiliary frequency term from the signals being received, controllable oscillator means for generating a signal equal to said difference, first mixer means coupled to said isolating means and to said controllable oscillator for beating said generated signal with said auxiliary frequency term for creating an effective carrier signal effectively corresponding to the suppressed carrier frequency, second mixer means coupled to the output of said first mixer means for beating said effective carrier signal with said P.C.M. signals being received for coherent detection thereof, and control circuit means for controlling the frequency of said controllable oscillator including a full-wave rectifier coupled to the output of said second mixer means, and a frequency divider coupled to the output of said full-wave rectifier for providing said fraction less-than-one of the pulse-repetition frequency, said frequency divider being connected to said controllable oscillator.

4. Radio receiver apparatus for the coherent detection of single-sideband, suppressed-carrier, amplitude-modulated P.C.M. signals being received and which include an auxiliary frequency term of a frequency differing from the suppressed-carrier frequency by a frequency difference equal to a fraction less-than-one of the pulse repetition frequency, said radio receiver apparatus including local oscillator means and first mixer means for translating said signals to an intermediate frequency, isolating means for isolating said auxiliary frequency term from the intermediate frequency signals, controllable oscillator means for generating a signal equal to said difference, second mixer means coupled to said isolating means and to said controllable oscillator for beating said generated signal with said auxiliary frequency term for creating an effective translated carrier signal having a frequency which is equal to the carrier frequency translated to intermediate frequency, third mixer means coupled to the output of said second mixer means for beating said effective carrier signal with said P.C.M. signals being received for coherent detection thereof, and control circuit means connected between the output of said third mixer means for controlling the frequency of said controllable oscillator as a function of the output from said third mixer means.

5. A radio communication system comprising means for providing a single-sideband, suppressed-carrier, amplitude-modulated P.C.M. signal, transmitting means for transmitting said signal, means for providing an auxiliary signal having a frequency equal to the carrier frequency shifted by a fraction less-than-one of the pulse-repetition frequency, means for supplying said auxiliary signal to the transmitting means, radio receiving apparatus including filter means for separating said auxiliary signal from the P.C.M. signal, controllable oscillator means for providing said fraction less-than-one of the pulse-repetition frequency, first mixer means for beating the signal from said controllable oscillator means with said separated auxiliary signal for creating an effective carrier signal, second mixer means for beating said effective carrier signal with the P.C.M. for coherent detection thereof, and control means coupled from the output of said second mixer means to said controllable oscillator for controlling said oscillator to provide said fraction less-than-one of the pulse-repetition frequency.

6. A radio communication system comprising means for providing a single-sideband, suppressed-carrier, amplitude-modulated P.C.M. signal, transmitting means for transmitting said signal, means for providing an auxiliary signal having a frequency equal to the carrier frequency shifted by a fraction less-than-one of the pulse-repetition frequency, means for supplying said auxiliary signal to the transmitting means, radio receiving apparatus including filter means for separating said auxiliary signal from the P.C.M. signal, controllable oscillator means for providing said fraction less-than-one of the pulse-repetition frequency, first mixer means for beating the signal from said controllable oscillator means with said separated auxiliary signal for creating an effective carrier signal, second mixer means for beating said effective carrier signal with the P.C.M. for coherent detection thereof, control means coupled from the output of said second mixer means to said controllable oscillator for controlling said oscillator to provide said fraction less-than-one of the pulse-repetition frequency including full-wave rectifier means, and frequency divider means coupled to the output of said full-wave rectifier means.

References Cited by the Examiner

UNITED STATES PATENTS

| | | | |
|---|---|---|---|
| 3,088,070 | 4/1963 | Robel | 325—50 |
| 3,182,259 | 5/1965 | Holder | 325—50 |

(Other references on following page)

FOREIGN PATENTS 480,847 3/1938 Great Britain.

OTHER REFERENCES

Schroder, German application No. 1,127,955, published April 1962 (1 sht. dwg., 5 pp. spec.), (British Patent No. 952,033, equivalent except for receiver converter in figure 3 (1 sht. dwg., 5 pp. spec.)).

Bell Telephone Labs., Staff, Transmission ɔystems for Communications, Bell Telephone Labs., N.Y., 1959 (pages 26–17 through 26–23).

Bell, Information Theory and Its Engineering Applications; 3d edition, 1962, pages 41–44 and 126–129.

DAVID G. REDINBAUGH, *Primary Examiner.*

B. V. SAFOUREK, *Assistant Examiner.*